Sept. 15, 1964  R. ROMANINI  3,148,756
RESILIENT TORQUE TRANSMITTING CONNECTION
FOR FRICTION CLUTCH PLATE Filed Nov. 13, 1962  2 Sheets-Sheet 1

INVENTOR

BY

ATTORNEY

3,148,756
RESILIENT TORQUE TRANSMITTING CONNECTION FOR FRICTION CLUTCH PLATE
Romeo Romanini, Turin, Italy, assignor to Lancia & C. Fabbrica Automobili-Torino S.p.A., Turin, Italy
Filed Nov. 13, 1962, Ser. No. 236,826
3 Claims. (Cl. 192—107)

This invention relates to friction clutches for motor vehicles provided with a resilient connection between the driving and driven portion of the clutch for resiliently transmitting the torque.

In clutches of this kind the resilient connection is adapted to absorb jerks deriving from incorrect operation of the clutch.

An object of this invention is to provide a friction clutch of the abovementioned type which, in addition to absorbing jerks deriving from incorrect operation, attenuates noisiness of the speedbox gears and differential gear due to periodical unevenness in torque.

A further object of this invention is to provide a clutch of the type referred to above which transmits torque between the driving and driven portion even when the resilient connection between these parts is damaged.

Figure 1:
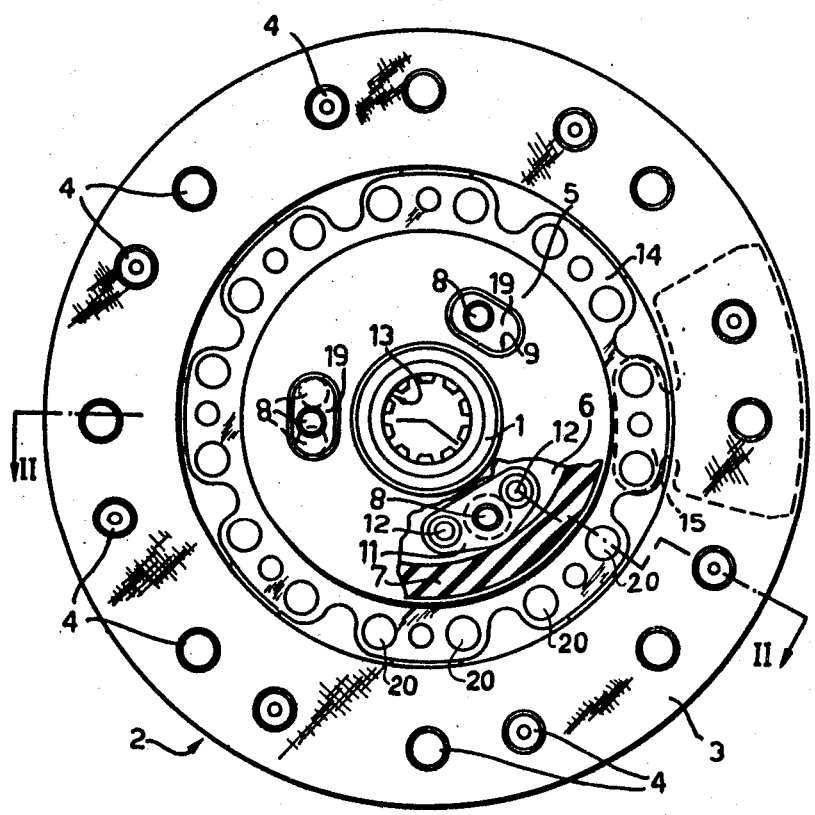
Figure 2:
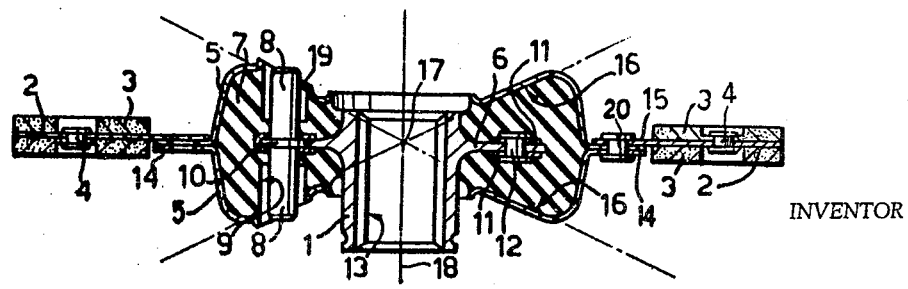
Figure 3:
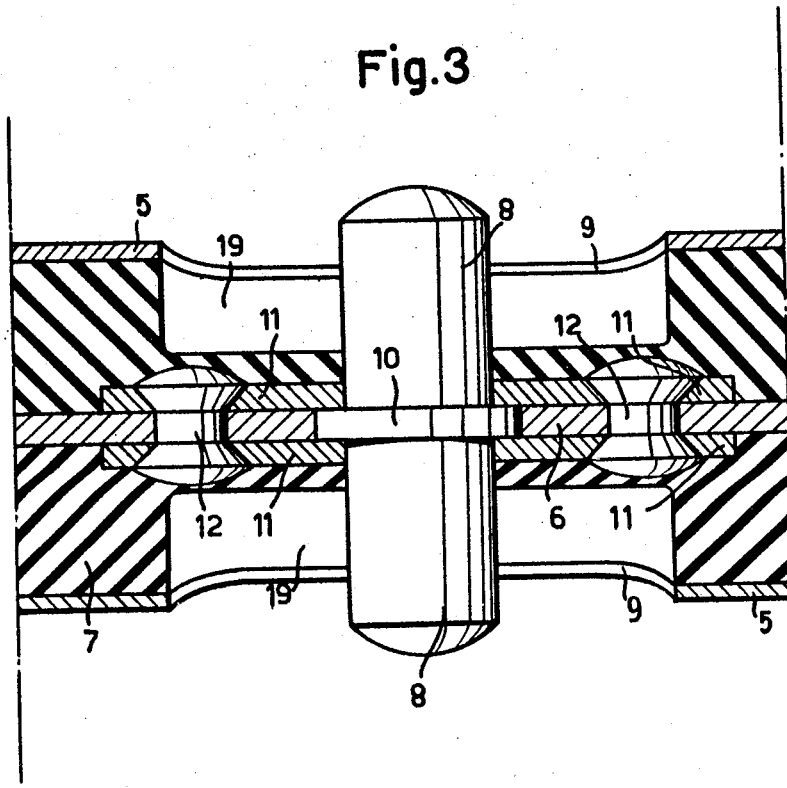

These and other objects of the invention are achieved by providing between a driving and driven portion of a known friction clutch a friction plate comprising resilient means of which construction and functioning will be understood from the following detailed description referring to the accompanying drawings given by way of an example, wherein:

FIGURE 1 is a front view of a friction clutch plate according to this invention, FIGURE 2 is a sectional view on line II—II of FIGURE 1, FIGURE 3 is a part sectional view on an enlarged scale a portion of the friction clutch of FIGURE 1.

A hub 1 is formed with a splined axial bore 13 for coupling with the driven clutch shaft, not shown in the figures.

The improved plate comprises a hub 1 having a flat flange 6 extending externally of the hub perpendicular to the hub axis.

The hub 1 is arranged coaxially with a flat rim 2 provided on both faces with friction linings 3 secured by means of rivets 4.

Two annular flanges 5 having outer circumferential edges 14 superimposed on each other and riveted together by a number of rivets 20 spaced along an inner edge 15 of the rim 2 extending from the rim 2 towards the hub 1.

The annular flanges 5 are axially spaced and define a clearance enclosing the flat flange 6 which is situated in the middle plane of the clearance, hence mainly in the plane of the rim 2.

The annular flanges 5 secured to the rim 2 are each formed towards the flange 6 on the hub 1 with a conical surface 16, the apex of which is conveniently situated at a point on the hub axis 18 which is the geometrical center 17 of the plate, as illustrated by the lines superimposed on FIG. 2.

Three eyelets 9 extending circumferentially are cut in each of the annular flanges 5 internally of a circumference matching in diameter the flat flange 6.

The eyelets 9 in one flange are angularly spaced through 120° and are axially aligned with the eyelets in the other flange, so that an eyelet 9 in a flange 5 is in register with an eyelet 9 in the other flange 5 to form a pair of co-axial eyelets.

Any desired number of eyelets 9 can be provided in each flange 5, without affecting operation of the plate.

Each pair of eyelets 9 have associated therewith two axially aligned pegs 8 transversely and rigidly secured to the flat flange 6 on the hub 1.

The two pegs 8 form a pair and extend at right angles from the flat flange 6 through the eyelets 9 to the outside of the flanges 5.

A ring 7 of solid elastic rubber fills the clearance defined by the two flanges 5 and is bonded both to the flat flange 6 on the hub 1 and to both facing annular surfaces of flanges 5 to act as a resilient connection between the hub 1 and the rim 2.

In the ring 7 three evenly spaced recesses 19 are formed in such a manner, that on assembly of the plate the recesses 9 are matching respective eyelets 9 so as to open outwardly throughout the area of its respective eyelet 9. Thereby, upon deformation of the ring 7, the pegs 8 are each capable of coming into bearing contact with either one or the other end portion of their associated eyelets 9 as a given positive or negative torque, respectively, is exceeded.

The values of such torques are kept below the maximum torque transmissible through the resilient ring 7.

In assembly the improved friction plate the ring 7 is conveniently pre-stressed in an axial direction between the flange 6 on the hub 1 and flanges 5 on the rim 2.

According to a preferred embodiment the pairs of pegs 8 are each formed as an integral component having a central collar 10 equalling in axial thickness the thickness of the flat flange 6.

As shown in FIGURE 3 the collar 10 is seated in a bore of corresponding diameter formed in the flat flange 6 and is retained therein by two plates 11 secured around the hole on each side of the flat flange 6 by means of rivets 12.

In the improved plate structure the ring 7 is subjected to shearing stresses and therefore below a predetermined value of transmitted torque, affords a considerable torsional flexibility which is highly efficient in attenuating the noisiness of the speedbox and differential gear.

In operation, as long as the torque transmitted by the plate is below said predetermined value, the pegs 8 do not bear on the end portions of their respective eyelets 9 and the elasticity of the ring 7 damps the effects of periodical unevenness in driving torque on the speed box and differential gear.

When the transmitted torque reaches or exceeds said predetermined value, the deformation of the ring 7 becomes such that the pegs 8 come into contact with the end portions of their associated eyelets 9, the torque being then rigidly taken up by the plate and the damping action of the ring is suppressed.

Experiments have shown that periodical unevenness in driving torque on motor vehicles cause an appreciable noisiness of the motor vehicle speedbox and differential gear at low values of the torque, and that this noise rapidly decreases on increase of the torque.

For this reason the angular length of the eyelets 9 is of an extent corresponding to the deformation of the ring 7 under the action of torques ranging between 50% and 60% of the maximum torque transmissible through the ring.

Above said values periodical unevenness in driving torque cause only a a negligible noisiness of the gears.

In case of damage to the ring 7 the torque transmitted is exclusively taken up by the rigid pegs and flanges, so that the plate is operative notwithstanding the damage.

It is to be understood that the invention is not to be limited to the specific constructions and arrangements shown and described, except only insofar as the claims may be so limited, as it will be understood to those skilled in the art that changes may be made without departing from the principles of the invention.

What I claim is:

1. A friction clutch plate for motor vehicles comprising a plate having a flat rim portion provided with friction linings on both faces, a hub coaxially arranged with the rim and a resilient connection for resiliently transmitting torque between said hub and rim, said resilient connection comprising a flat flange situated substantially in the rim plane, a pair of flanges secured to the rim extending from the latter towards the hub enclosing therebetween the flat flange in a spaced relationship in an axial direction, at least a pair of eyelets extending circumferentially in axial alignment in their respective rim flanges within the diameter of the flat flange, a pair of rigid axially aligned pegs extending from the flat flange through their respective eyelets, a filling of resilient solid rubber in the clearance between the rim flanges, means bonding said filling both to the flat flange and rim flanges to act as a resilient connection between the hub and rim for transmitting torque, a recess in said filling around each of said pegs opening to the outside throughout the area of its respective eyelet, whereby the pegs are each free to come into bearing contact with the end portions of the irrespective eyelet as a given positive or negative value of transmitted torque is exceeded, the value of said torque being lower than the maximum torque transmissible through the resilient connection.

2. A friction clutch plate for motor vehicles comprising a plate having a flat rim portion provided with friction linings on both faces, a hub coaxially arranged in the rim and a resilient connection for resilient transmission of torque between the hub and rim, said resilient connection comprising a flat flange, situated generally in the rim plane, a pair of flanges secured to the rim extending from the latter towards the hub and enclosing the flat flange in a spaced relationship in an axial direction, the flanges secured to the rim being each made of pressed sheet metal and riveted along their outer circumferential edge to the inner edge of the rim, each of the said flanges secured to the rim being formed towards the flat flange with a conical surface having its apex situated in the geometrical plate center, at least a pair of circumferentially extending eyelets axially aligned in their respective rim flanges within the diameter of the flat flange, a pair of rigid axially aligned pegs extending from the flat flange through their respective eyelets, a filling of resilient solid rubber in the clearance between the rim flanges, means bonding siad filling both to the hub flat flange and the two rim flanges to act as a resilient connection between the hub and rim for transmitting torque means prestressing, said filling in an axial direction between the hub flange and rim flanges, a recess in said filling around each of said pegs opening outwardly throughout the area of its respective eyelet, whereby the pegs are each capable of coming into bearing contact with the end portions of their respective eyelets as a given positive and a given negative torque, respectively, is exceeded, the values of said torque being lower than the maximum torque transmissible through the resilient connection.

3. A friction clutch plate for motor vehicles, comprising a plate having a flat rim portion provided with friction linings on both faces, a hub arranged coaxially with the rim and a resilient connection between the hub and rim for resiliently transmitting torque, said resilient connection comprising a flat flange, situated generally in the plane of the rim, a pair of flanges secured to the rim extending from the latter towards the hub and enclosing therebetween the flat flange in a spaced relationship in an axial direction, each of said flanges secured to the rim being made of pressed sheet metal and riveted along its outer circumferential edge to the rim and outer circumferential edge on the other flange of said flange pair, each of said flanges secured to the rim being formed towards the flat flange with a conical surface having its apex situated in the geometrical plate center, at least a pair of circumferentially extending eyelets axially aligned in their respective rim flanges within the diameter of the flat flange, a pair of rigid axially aligned pegs extending from the flat flange through their respective eyelets, a filling of resilient solid rubber in the clearance between the rim flanges means bonding, said filling both to the flat flange and two rim flanges to act as a resilient connection between the hub and rim for transmitting torque means prestressing, said filling in an axial direction between the flat flange and rim flanges, a recess in said filling around each of said pegs opening outwardly throughout the area of its respective eyelet, whereby the pegs are each capable of coming into bearing contact for with the end portions of their respective eyelets as a given positive and negative torque, respectively, is exceeded, the value of said torque ranging between 50% and 60% of the maximum torque transmissible through the resilient connection.

References Cited in the file of this patent

UNITED STATES PATENTS

| | | |
|---|---|---|
| 2,182,387 | Probst | Dec. 5, 1939 |
| 2,234,443 | Macbeth | Mar. 11, 1941 |
| 2,397,642 | Blazek et al. | Apr. 2, 1946 |

FOREIGN PATENTS

| | | |
|---|---|---|
| 571,626 | Italy | June 13, 1958 |